United States Patent
Segal et al.

(10) Patent No.: US 10,802,833 B2
(45) Date of Patent: Oct. 13, 2020

(54) AUTOMATED PREBOOT PERFORMANCE MEASUREMENT

(71) Applicant: Intel Corporation, Santa Clara, CA (US)

(72) Inventors: Mark Segal, Jerusalem (IL); Vladimir Makarov, Jerusalem (IL); Udy Hershkovitz, Jerusalem (IL)

(73) Assignee: Intel Corporation, Santa Clara, CA (US)

(*) Notice: Subject to any disclaimer, the term of this patent is extended or adjusted under 35 U.S.C. 154(b) by 165 days.

(21) Appl. No.: 16/146,145

(22) Filed: Sep. 28, 2018

(65) Prior Publication Data
US 2019/0050234 A1    Feb. 14, 2019

(51) Int. Cl.
*G06F 9/4401* (2018.01)
*G06F 1/12* (2006.01)
*G06F 1/3228* (2019.01)
*G06F 11/30* (2006.01)
*G06F 1/14* (2006.01)

(52) U.S. Cl.
CPC .............. *G06F 9/4403* (2013.01); *G06F 1/12* (2013.01); *G06F 1/14* (2013.01); *G06F 1/3228* (2013.01); *G06F 11/30* (2013.01)

(58) Field of Classification Search
CPC . G06F 9/4403; G06F 1/14; G06F 1/12; G06F 1/3228; G06F 11/30
See application file for complete search history.

(56) References Cited

U.S. PATENT DOCUMENTS

| | | |
|---|---|---|
| 2014/0223586 A1 | 8/2014 | Berger et al. |
| 2016/0109900 A1* | 4/2016 | Kawashita ................ G06F 1/12 713/400 |
| 2019/0124445 A1* | 4/2019 | Banerjee ............... H04J 3/0641 |

* cited by examiner

*Primary Examiner* — Jaweed A Abbaszadeh
*Assistant Examiner* — Hyun Soo Kim
(74) *Attorney, Agent, or Firm* — Alliance IP, LLC

(57) ABSTRACT

A system includes a central processing unit (CPU) and components, a particular one of including logic to participate in a portion of a boot sequence of the system, where the portion of the boot sequence begins prior to activation of the CPU. The particular component is to send one or more signals to interact with another one of the components in the system during the portion of the boot sequence. The particular component includes a timer block to generate a set of timestamps during the portion of the boot sequence, where the set of timestamps indicates an amount of execution time of the particular component. The particular component sends the set of timestamps to the other component in a particular one of the one or more signals, where the set of timestamps are used to determine execution time of system components to complete the boot sequence.

20 Claims, 10 Drawing Sheets

AUTOMATED PREBOOT PERFORMANCE MEASUREMENT

TECHNICAL FIELD

This disclosure relates in general to the field of computer systems and, more particularly, to using analyzing computer platform boot flow performance.

BACKGROUND

The Internet has enabled interconnection of different computer networks all over the world. While previously, Internet-connectivity was limited to conventional general purpose computing systems, ever increasing numbers and types of products are being redesigned to accommodate connectivity with other devices over computer networks, including the Internet. For example, smart phones, tablet computers, wearables, and other mobile computing devices have become very popular, even supplanting larger, more traditional general purpose computing devices, such as traditional desktop computers, in recent years. Increasingly, tasks traditionally performed on general purpose computers are performed using mobile computing devices with smaller form factors and more constrained feature sets and operating systems. Further, traditional appliances and devices are becoming "smarter" as they are ubiquitous and equipped with functionality to connect to or consume content from the Internet. For instance, devices, such as televisions, gaming systems, household appliances, thermostats, automobiles, watches, have been outfitted with network adapters to allow the devices to connect with the Internet (or another device) either directly or through a connection with another computer connected to the network. Additionally, in-vehicle computing systems are developing into standard systems, providing such features to users through their automobiles such as internet connectivity, navigation, entertainment, and other functionality. Designing and testing such new and rapidly developing classes of systems may introduce new considerations and issues.

BRIEF DESCRIPTION OF THE DRAWINGS

Like reference numbers and designations in the various drawings indicate like elements.

DETAILED DESCRIPTION OF EXAMPLE EMBODIMENTS

Figure 1:
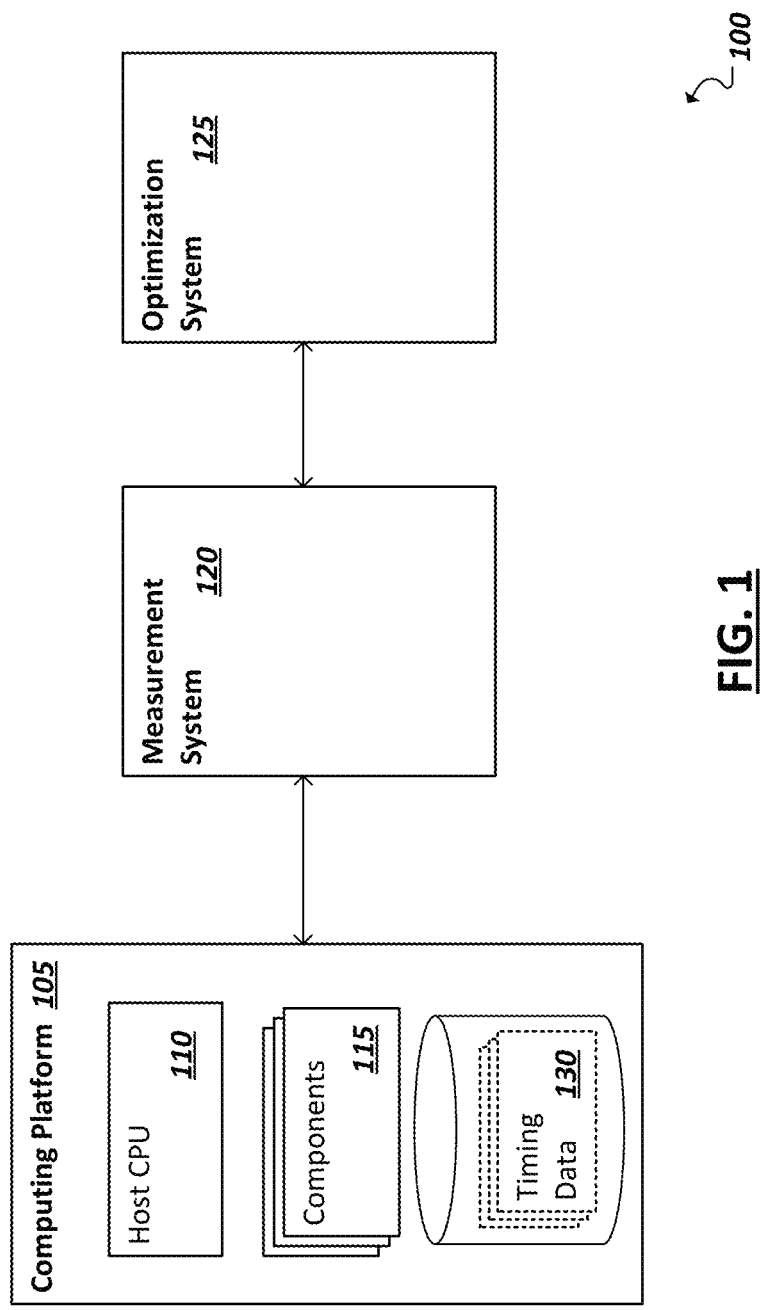
FIG. 1 is a simplified block diagram of an example computing system.

Some computing systems may have very strict boot time requirements, such as some automotive and internet of things (IOT) systems. In some implementations, the initial power-on (or key-on) event is used as the starting point for measuring execution time or boot time of the system. As an example, an in-vehicle automotive system may be benchmarked or have a requirement to have its rear (and other) cameras and audio operational within a set amount of time from a key-on event (e.g., less than 2 seconds from power-on). However, accurately determining and diagnosing the respective contributions of individual components within a computing system to the overall boot time may be complicated by components that operate during a "pre-boot time" before a main platform processor has been launched and while host- and software-based monitoring tools are unavailable to track the execution of time. In designing, servicing, and optimizing a platform to meet certain performance thresholds, it may be desirable to determine opportunities for improvements within the boot flow of the platform. However, pre-boot components, processes, and activities effectively create a blind spot in traditional diagnostic and monitoring tools, making it difficult to even understand where such opportunities exist.

In some environments, special external measurement hardware and systems may be used to attempt to measure pre-boot performance. However, existing systems provide no convenient, automated way to measure and understand how much time is spent by various components in the pre-boot phase, or another phase before the main platform processor (e.g., host central processor unit (CPU)) is out of reset. As noted above, traditionally, attempts to measure pre-boot performance rely on a collection of manual experiments and tests, involving several pre-boot and post-boot components. This effort may involve many performance measurements that unfortunately require a lot of manual work of building special engineering images and connecting dedicated HW equipment (e.g., oscilloscopes, etc.) to observe pre-boot behavior, among other example issues In some implementations, pre-boot components may be augmented with a mechanism to collect critical pre-boot data and expose this collected data to host software (e.g., BIOS). Through such devices, measuring end-to-end boot performance may be full automated, allowing critical data to be identified and considered in the development and maintenance of computing systems, all with the need for connecting dedicated hardware tools or using custom engineering builds. This may allow more manual and expensive solutions to be avoided, which may also be limited in their ability to scale and be implemented and used in production platforms and customer systems, among other example issues. Further, augmented pre-boot components may further enhance pre-boot activities and interactions between components. For instance, clocks of the various pre-boot components may be synchronized or otherwise normalized, and the components may cooperate in configuring how pre-boot information is to be collected and shared, among other example advantages.

FIG. 1 is a simplified block diagram illustrating a simplified representation of a system 100 that includes a computing platform 100 with one or more components 115 augmented to measure pre-boot characteristics and enable the creation of a fully automated flow for measuring boot performance, including the measurement of performance contributions of pre-boot time components and processes without the use of any special external hardware. The computing platform 105 may additional include a main or host processing unit, such as a central processing unit (CPU) 110, which runs a system Basic Input/Output System (BIOS), Unified Extensible Firmware Interface (UEFI), and operating system (OS) or similar operating environment, upon which further programs, tools, and applications of the computing may run. Further, some of the components of computing platform 100 may be activated and run after the host CPU 110 is brought out of reset. For instance, cameras, displays, sensors, co-processors, and other hardware and software system implemented on the platform 100 may be directed by the host CPU 110 in kernel and/or user space, among other examples.

At least some of the components 115 of platform 105 may include functionality for self-monitoring its performance within a boot flow of the computing platform and generating data describing attributes of its performance. Critical performance information may include timing information collected by the components, which may be embodied in timing data 130 generated by the components 115. Other performance information may also be detected and corresponding attribute data (not shown) may be generated by the components. Such data, including timing data 130, may be made available to software tools, such a measurement system 120 used to determine aggregate or overall performance characteristics of the platform or subsystems within the platform. Measurement system 120 may also include logic to perform diagnostics to detect problems, bottle necks, critical flow paths, errors, and other issues affecting the platform 105 and its performance. Results generated by a measurement system 120 or even attribute data (e.g., 130) itself may be further consumed by an optimization system 125, among other example uses. In one example implementation, an optimization system 125 may be utilized to detect opportunities to improve performance of the platform, including configurations and parameters to employ within the platform, or even components to replace to enhance and improve performance of the overall platform 105 or particular subsystems of the platform 105. In one example, a boot time metric or threshold may be defined for a particular platform (e.g., 105) and measurement system 120 may be used to evaluate the various performance attributes generated by the platform, including components 115. In the same example, an optimization system 125 may detect opportunities to reconfigure various aspects of one or more components of the platform or reorder performance of one or more processes or events, among other potential modifications (e.g., based on measurement system results and/or attribute data generated on the computing platform 105) so as to decrease the boot time attributable to various components and thereby decrease the overall boot time of the platform or platform subsystem (e.g., in an attempt to meet the performance target or threshold), among other example implementations.

In general, "servers," "clients," "computing devices," "network elements," "hosts," "platforms", "system-type system entities," "user devices," "IoT devices," "automotive systems", "infotainment systems", "sensor devices," and "systems", etc. (e.g., 105, 120, 125) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing apparatus. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

In some implementations, all or a portion of a computing platform may function as an Internet of Things (IoT) device or system. A collection of devices, or endpoints, may participate in IoT networking, which may utilize wireless local area networks (WLAN), such as those standardized under IEEE 802.11 family of standards, home-area networks such as those standardized under the Zigbee Alliance, personal-area networks such as those standardized by the Bluetooth Special Interest Group, cellular data networks, such as those standardized by the Third-Generation Partnership Project (3GPP), and other types of networks, having wireless, or wired, connectivity. For example, an endpoint device may also achieve connectivity to a secure domain through a bus interface, such as a universal serial bus (USB)-type connection, a High-Definition Multimedia Interface (HDMI), or the like.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Figure 2:
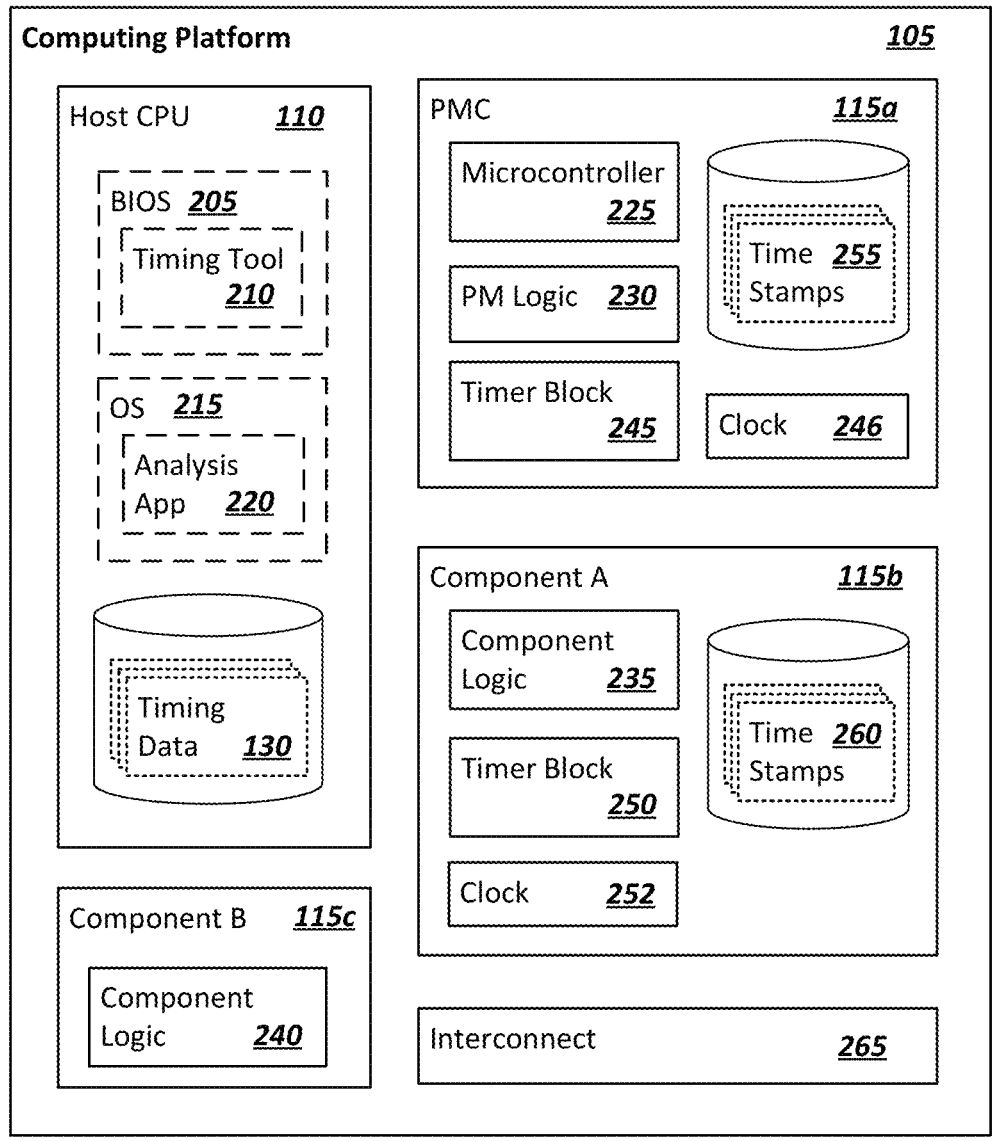
FIG. 2 is a simplified block diagram of an example computing platform.

With reference now to FIG. 2, a simplified block diagram 200 is shown illustrating an example implementation of a computing platform 105. The platform 105 may include a main CPU 110 capable of running a BIOS 205 and operating system 215, which may support or be used to launch various software-based diagnostic and performance monitoring tools. For instance, BIOS 205 may include a timing tool 210, which is capable measuring the execution time of various components and processes and generating corresponding timing data 130 to describe the respective execution times of these components and processes. In some implementations, a system analysis application 220 may be provided, which runs on OS 215 and provides deeper analytic capabilities to assess performance data (e.g., timing data 130) and other metrics determined and measured using BIOS-based performance monitoring tools (e.g., timing tool 210), among other examples. While BIOS-, UEFI-, and OS-based monitoring and performance analysis tools (e.g., 210, 220) may provide reliable measurements of components contributing to the boot time or other execution time of interest in the platform 105, these tools only become available after the host CPU 110 has come out of reset. However, in some implementations, such as the example illustrated in FIG. 2, a variety of pre-boot components, communications, workflows, and events may be provided in an example platform 105, for instance, to prepare the platform for the launch of the host CPU, including power management, security, networking, memory, and other preparations.

A particular component with a system platform may be configured and designated to be the first component that runs after platform power-on. This component may be equipped with its own microcontroller and firmware, among other logic, to run prior to the activation of host CPU 110. In some implementations, this "initial" component may be a power manager, such as PMC 115a. In some implementations, a PMC power manager may be the only component that actually "knows" when the platform is actually powered-on. Further, the proper functioning of one or more components may be dependent on the success of the PMC in configuring and testing power provided to components in the platform, among other example considerations. In other implementations, the initial component may be a component other than the host CPU or a power manager. In either case, the initial component may be provided with its own clock. As a result, the initial clock tick of the initial component may represent the true or fixed zero for the overall boot time of the system. This fixed zero may be used to normalize or synchronize clocks of one or more other components within the platform 105, among other example uses.

As noted above, one or more components (e.g., 115a-b) may be equipped with functionality (e.g., embodied in logic 230, 235, etc.) to perform tasks prior to the activation of the host CPU 110 in an example platform 105. For instance, a power management controller (PMC), power management unit (PMU), power management integrated chip (pmic), or other component capable of governing power functions and activities within the platform (referred to herein collectively as a "PMC" or "power manager") 115a may be provided. In some implementations, the PMC 115a may include a microcontroller 225 (separate from CPU 110) and firmware and/or hardware circuity to implement power management logic 230 to perform power management tasks and generate and consume signals communicated between the PMC 115a and other components (e.g., 110, 115b, 115c, etc.) of the platform 105 in connection with these power management tasks.

Other components (e.g., 115b) may be provided, which are to run in pre-boot time, that perform tasks and provide functionality other than power management. In other cases, PMC 115a may be the only component that runs in pre-boot time. In the example of FIG. 2, component 115b may include component logic 235 configured to implement the particular functionality of the component 115b. For instance, component 115b may be a security engine in some implementations, and component logic 235 may include hardware circuitry and/or firmware to implement various security functionality, such as a cryptographic engine, code scanners (e.g., for the BIOS or bootloader code, etc.), and functionality enabling communication between the component 115b and other components (e.g., 110, 115a, 115c, etc.) of the platform 105. Such a component, in some implementations, may likewise include its own clock 252 (and related clock management and synchronization logic). In its default state, the clock 252 of component 115b may be configured to run independently (and not be dependent upon other clocks (e.g., 246) of the platform 105).

In this example, components 115a-115b may be configured to perform pre-boot time tasks in platform 105. In some implementations, functionality of the components may be enhanced to enable the components to self-monitor their performance and collect various measurements and information concerning the characteristics of the components' respective pre-boot time performance. This may allow such critical performance characteristics to be measured and exposed even before the host CPU 110 and measurement tools running on the CPU 110 are available within the platform 105. For instance, respective timer blocks (e.g., 245, 250) may be provided on components 115a, 115b. In some implementations, timer blocks 245, 250 may include a tick counter or other timing logic and generate timestamps or other timing data (e.g., 255, 260) documenting the amount of time that has passed since the component (e.g., 115a, 115b) was powered on, began executing a particular task, or since the generation of a preceding timestamp, among other example implementations and timing reference points. A timer block 245, 250 may measure time at various resolutions or unit intervals (e.g., microseconds, milliseconds, etc.) and generate corresponding timestamp data 255, 260 reporting the measured time.

Example timer blocks (e.g., 245, 250) provided for components (e.g., 115a-c) configured to operate in pre-boot time, may be further equipped with communication logic to generate, modify, or supplement messages that are to be sent between components (e.g., 110, 115a-c, 205, etc.) of the platform, such that the messages include timing information corresponding to the timing data embodied in timestamps (e.g., 255, 260) generated by the corresponding timer block (e.g., 245, 250). Example timer blocks (e.g., 245, 250) may additionally include logic to consume such messages sent from other components, such that the timestamps (e.g., 260) generated by the timer block (e.g., 250) may be normalized and/or aggregated with timestamps (e.g., 255) received from another component (e.g., 115a). This may allow pre-boot components (e.g., 115a-b) to generate a contiguous chain of timing information (e.g., embodied as a chain or collection of timestamps (e.g., 255, 260) generated at each of the components (e.g., 115a-b)), which collectively describes the combined time of execution of the collection of pre-boot components. For instance, such augmented devices may interoperate to implement a chain of performance data transfer between all main pre-boot components that run before main CPU is out reset. For instance, each component may collect its own boot timestamps and other critical performance data and pass the data (e.g., in one or more batches) to the next component in the boot phase. The last component in the chain may pass the accumulative boot time and other performance data to the BIOS, which can then expose the data through an existing BIOS API to the operating system (OS) or Unified Extensible Firmware Interface (UEFI) shell, among other examples. Such a data transfer chain may enable or form a portion of a fully automated system configured to measure pre-boot performance data. Such a performance data chain may also serve to assist pre-boot component to achieve clock synchronization between the different clocks each component is using. Additionally, the performance data chain implemented using such augmented computing components may be utilized directly by production code, without the need of custom engineering builds or custom tools. Further, customer production platforms, from personal computing devices, IoT devices, automotive computing systems, and other platforms may also utilize performance data obtained from this chain of components, both in design, testing, and other pre-production environments, as well as in production environments.

As shown in FIG. 2, one or more interconnects or interconnect fabrics (e.g., 265) may be provided in the platform 105 to enable communication within the platform. In some implementations, the platform may be implemented as a system on chip (SoC), where multiple components (e.g., 110, 115a-c) are provided on the same die, while in other cases some of the platform components may be on different die (but on the same board) or even separate boards within the same system, among a variety of other configurations and implementations. Based on the implementation, a variety of different interconnect technologies may be employed to facilitate communications between components (e.g., System Management Bus (SMBus), I2C, Serial Peripheral Interface (SPI), proprietary or specialized hardware interfaces, shared memory messaging, etc.). Indeed, different technologies may be used to connect different pairs of components within the same platform, among other examples. In some cases, the protocols employed may be lightweight protocols such that the messages passed on relatively small so as not to significantly impact boot performance, among other examples.

It should be appreciated that, in some implementations, only a subset of components (e.g., 115a-b) may perform work during pre-boot time, while other components (e.g., 110, 115c) may be active after the CPU has emerged from reset. Accordingly, such components (e.g., 115c) may include logic (e.g., component logic 240) to perform the specific functionality of the component within the platform, but may not be provided with extra logic to implement a timer block (e.g., 245, 250) or similar functionality, as host-level tools (e.g., timing tool 210) may be available and sufficient to monitor the performance of these components (e.g., 115c), including their execution time within a boot flow, among other example characteristics.

A variety of different systems may have demanding boot time requirements. For instance, various smart home, IoT, security system devices, industrial sensors and monitors, and other systems may have a defined benchmark for activating certain systems and providing data and other results within a certain amount of time following power-on. As discussed above, in-vehicle systems may serve as another example of systems, where an aggressive time limit is defined for the system to have activated certain functionality. In any of these examples, the challenge of improving boot performance time may be complicated by the difficulty in assessing the contributions of pre-boot components within the system to the overall boot time. This may make it difficult, for instance, to understand or identify that an issue or bottleneck in the boot flow stems from a given pre-boot component's performance, among other issues.

Figure 3:
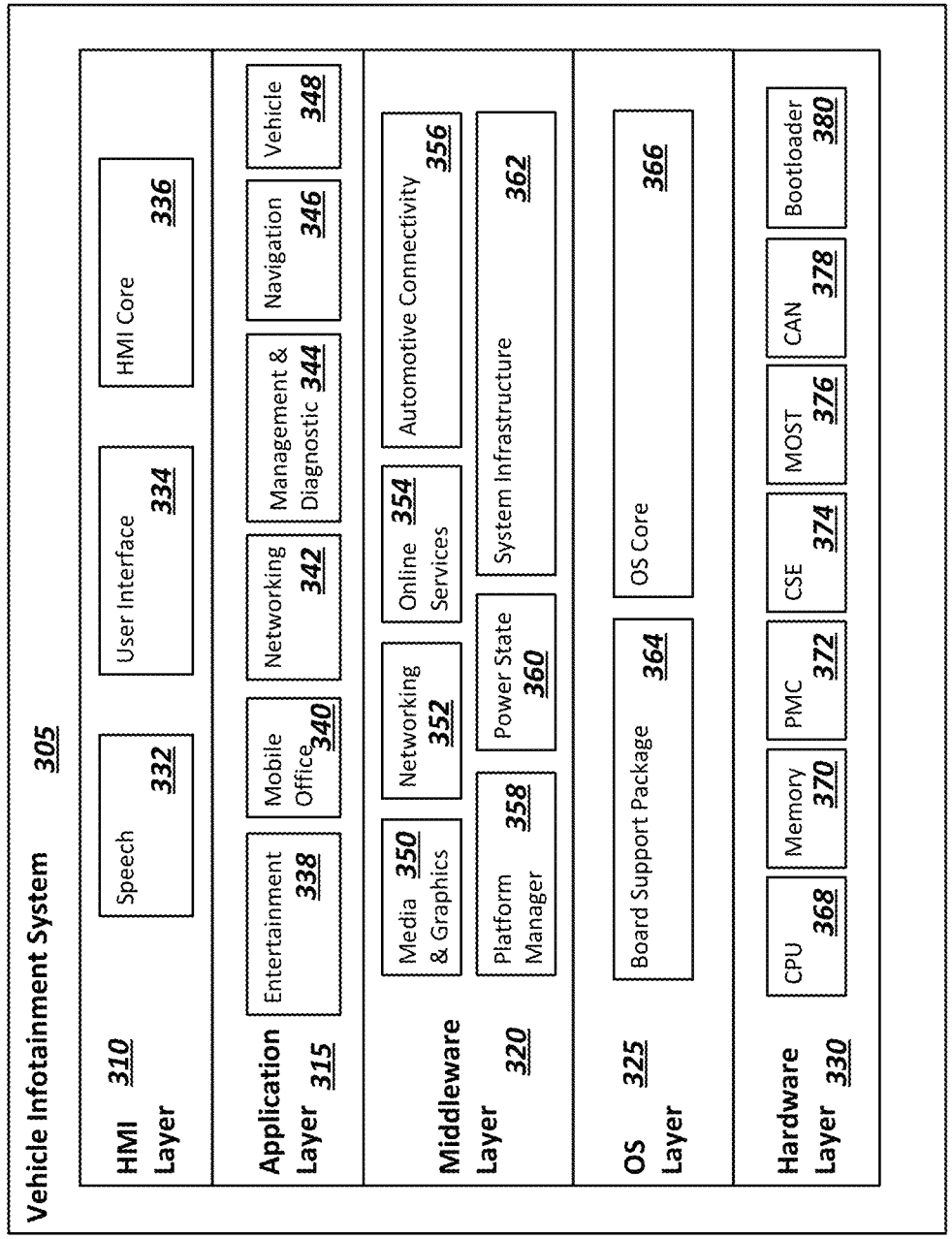
FIG. 3 is a simplified block diagram of an example in-vehicle computing platform.

Turning to FIG. 3, a simplified block diagram 300 is shown of an example info in-vehicle infotainment system 305. The system 305 may have a layered architecture, with a human-machine interface (HMI) or user interface (UI) layer (e.g., 310) sitting above an application layer 315. The application layer 315 may sit above a middleware layer 320 and operating system layer 325 built on top of the base hardware layer 330. In one example, an HMI layer 310 may include a speech recognition module 332, user interface (e.g., provided through a touch display), and HMI core 336. The HMI layer 310 may enable a user to interface and consume services and information provided through application layer 315, such as entertainment module 338 (e.g., providing video and audio presentations), a mobile office suite 340, networking module 342, system management and diagnostics 344, navigation 346 (e.g., through global positioning (GPS)), and a vehicle system management module 348, among other examples. Applications (E.g., 338-348) may access and make use of middleware components such as media and graphics engine 350, network module 352, online service 354, automotive connectivity module 356, platform manager 358, power state manager 360, and system architecture module 362, among other examples. In this example, OS layer 325 may include a board support package 364 and the OS core 366. Various hardware may be provided in the system 305, as defined in hardware layer 330. For instance, in this example, a host CPU 368, computer memory 370, a PMC 372, a security engine 374, a Media Oriented Systems Transport (MOST) bus 376 and Controller Area Network (CAN) bus 378 (among other interconnect components), bootloader 380, among other example hardware components may be provided. As discussed above, components in the hardware layer 330 that launch and perform tasks prior to the activation of the CPU (e.g., 368) may be provided with timer block and other monitoring logic to enable the components to self-monitor and waterfall reporting of observed performance information to higher level components provided through the CPU 368, among other examples.

While the example of FIG. 3 illustrates a hardware layer (and upper layers) of an example in-vehicle system, it is emphasized that this illustration is provided by way of example only. Indeed, other non-vehicle or non-infotainment systems may have similarly layered architecture with similar (or different) combinations of hardware, applications, and other components. It should be appreciated that such alternate examples may also include hardware components augmented to detect pre-boot performance data, including timing information, among other examples.

Figure 4A:
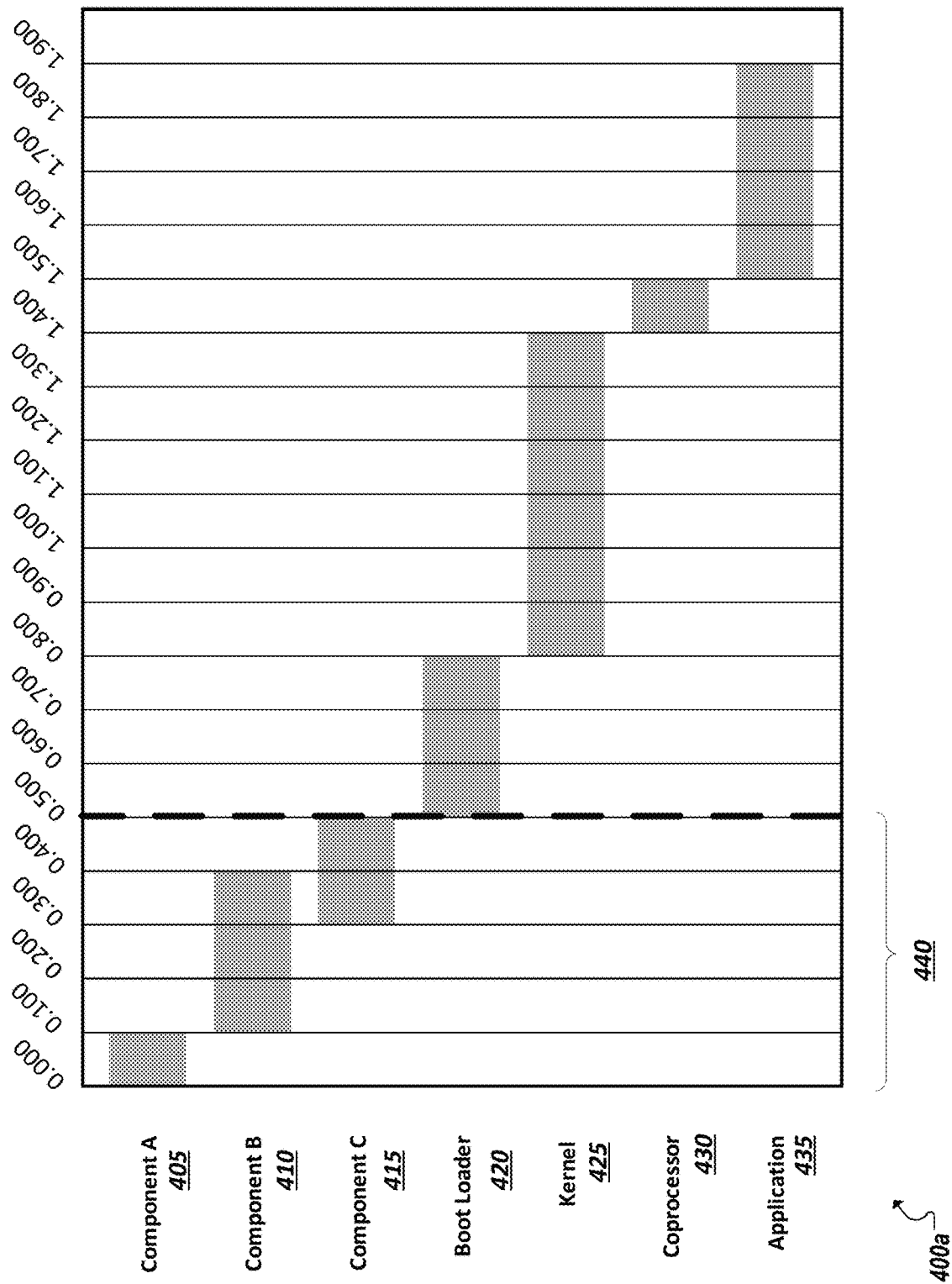
FIGS. 4A-4B are example boot flow timing diagrams.

FIG. 4A is a diagram 400a representing boot performance of an example system. In particular, in this example, the contributions of each of a set of components (e.g., 405, 410, 415, 420, 425, 430, 435, etc.) within a determined critical flow path of the boot flow is represented. For instance, respective phases of various components' execution may be determined to be part of the critical flow path, as the start of other components may be dependent on these preceding phases. Other operations and tasks within other phases of a given component's execution may fall outside of the critical flow path, such as phases of the component's execution following a phase defined to be within the critical flow path (e.g., upon which subsequent components' execution is not dependent). Determining a critical flow path of a system's boot flow may not be intuitive. In some cases, this determination is made manually following multiple tests and experiments revealing trends in how and what portion of each component's flow contributes to the overall boot time, and how dependent the overall boot time is on the time used to perform the component's tasks. In some implementation, a critical flow path may be determined autonomously by a computing system, such as through a deep learning model implemented on the system, heuristic modeling, among other examples.

Regardless of how a critical flow path of a boot flow is determined, performance of a given component within its portion of the critical flow path may be monitored to ascertain the contribution of each component to the overall boot time. In the example of FIG. 4A, a critical flow path may begin with a phase of execution of Component A 405 (including one or more tasks performed by the component 405), followed by a phase of execution of Component B 410. In this example, the measured phase of Component A may cause one or more components, including Component B, to begin executing. The beginning of other components' phases (e.g., Component C) may be triggered by signals from multiple other components, the detection of conditions on one or more components, among other example conditions. In this example, Component C 415 may cause a Boot Loader component 420 to begin, which corresponds with the activation of a host CPU on the platform. Accordingly, the timing information for the portions of the critical flow path contributed by Components A-C may be considered pre-boot flow path portions (e.g., in 440), while all subsequent portions of the critical flow path (e.g., contributed to by kernel 425, co-processor 430, and application 435 (among other example components) are portions of the execution, which may be observed and transparent to measurement tools executed using the host CPU. The portion of execution (e.g., 406, 412, 416) corresponding to pre-boot components (e.g., 405, 410, 415), however, may be invisible to CPU-level monitoring tools. Accordingly, in some implementations, pre-boot time activities performed by these "pre-boot" components (e.g., 405, 410, 415) may be captured internally at the respective components and corresponding data fed through a chain including these components, to pass detailed timing and other performance data to system software or other higher-level components executing on the platform. As a component may begin operating in pre-boot time, but continue operating after the CPU has emerged from reset, in some cases, only a portion of the timing information may be measured at the component corresponding to pre-boot activities of the component, while other actions and performance characteristics are monitored using CPU- and/or software-based measuring tools, among other examples.

Figure 4B:
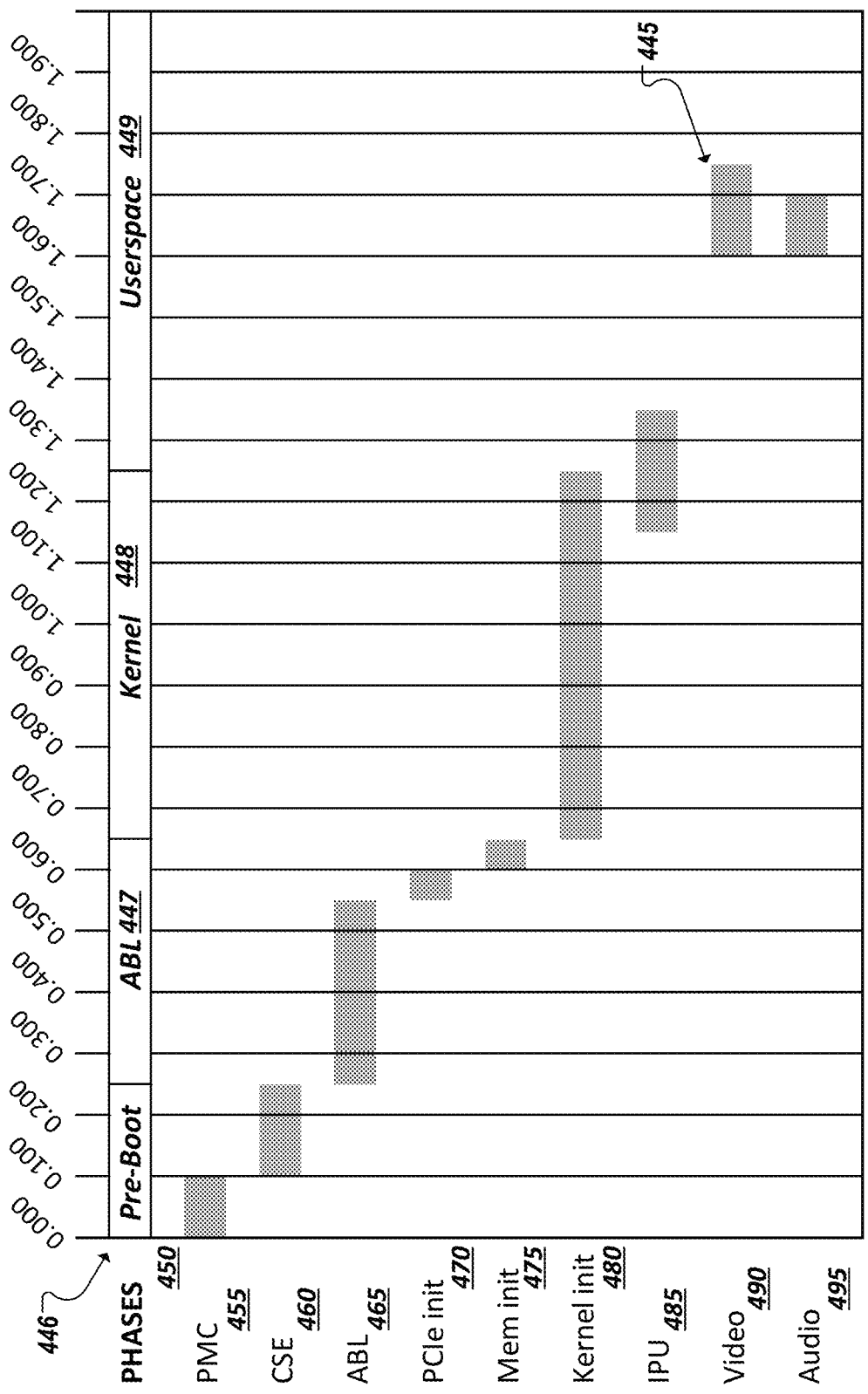

FIG. 4B shows another diagram 400b illustrating a specific example of boot performance in an example computing system. In the particular example of FIG. 4B, a boot performance diagram 400b is shown representing performance of an example in-vehicle infotainment system. The timings shown in the diagram 400b may represent only a portion of the execution times measured in the system and the subset of times may be selected (e.g., by system software) based on the times representing the critical chain contributing to the overall boot time of the system. In other implementations, components may be preconfigured to "know" which processes of the component are contributors such a critical chain, and data collected and passed in a performance data chain may be directed to those components associated with the critical chain. In this particular example, a target execution time of 2 seconds may be set from the moment the system is powered- or keyed-on to the time when images are presented on a display of the infotainment system (e.g., at 445) (which the system in this example meets).

Continuing with the specific example of FIG. 4B, the example boot flow for the example infotainment system may include phases including: a power stabilization phase including power managements and power stabilization activities, a security engine phase to perform pre-boot security checks in hardware of the system, a boot loader phase (e.g., automotive boot loader (ABL)) 447 that includes the launch of a BIOS for the automotive system and continues until a handoff to the automotive infotainment system OS, an OS kernel phase 448 including host OS steps in OS kernel mode, and, finally, an OS user space phase 449 including all steps running in user mode up to the target point of measurement (e.g., the presentation of a first frame captured by a parking assist or collision avoidance camera or sensor on a user display of the vehicle), among other examples. Indeed, various benchmarks and phases may be defined based on the system and application being tested (e.g., to measure time and performance up through the completion of a defined set of events on the system).

As in the more generalized example of FIG. 4B, one or more phases and events in the boot flow illustrated in FIG. 4B may be performed by components (e.g., PMC 455, security engine (CSE) 460) before the main system CPU is out of reset (e.g., the power stabilization phase and security engine phase constituting the pre-boot phase 446 of the boot flow), while the remaining phases (e.g., 447-449) occur after the CPU emerges from reset. Accordingly, in this example, execution time measurements and other parameters from pre-boot time 446 are collected using augmented components (e.g., 455, 460) with integrated hardware circuitry and/or firmware capable of collecting and tracking such information without the assistance of host CPU facilities or system software (which may be used to collect performance information for the later phases (e.g., 447-449) available after the host CPU is launched).

Figure 5A:
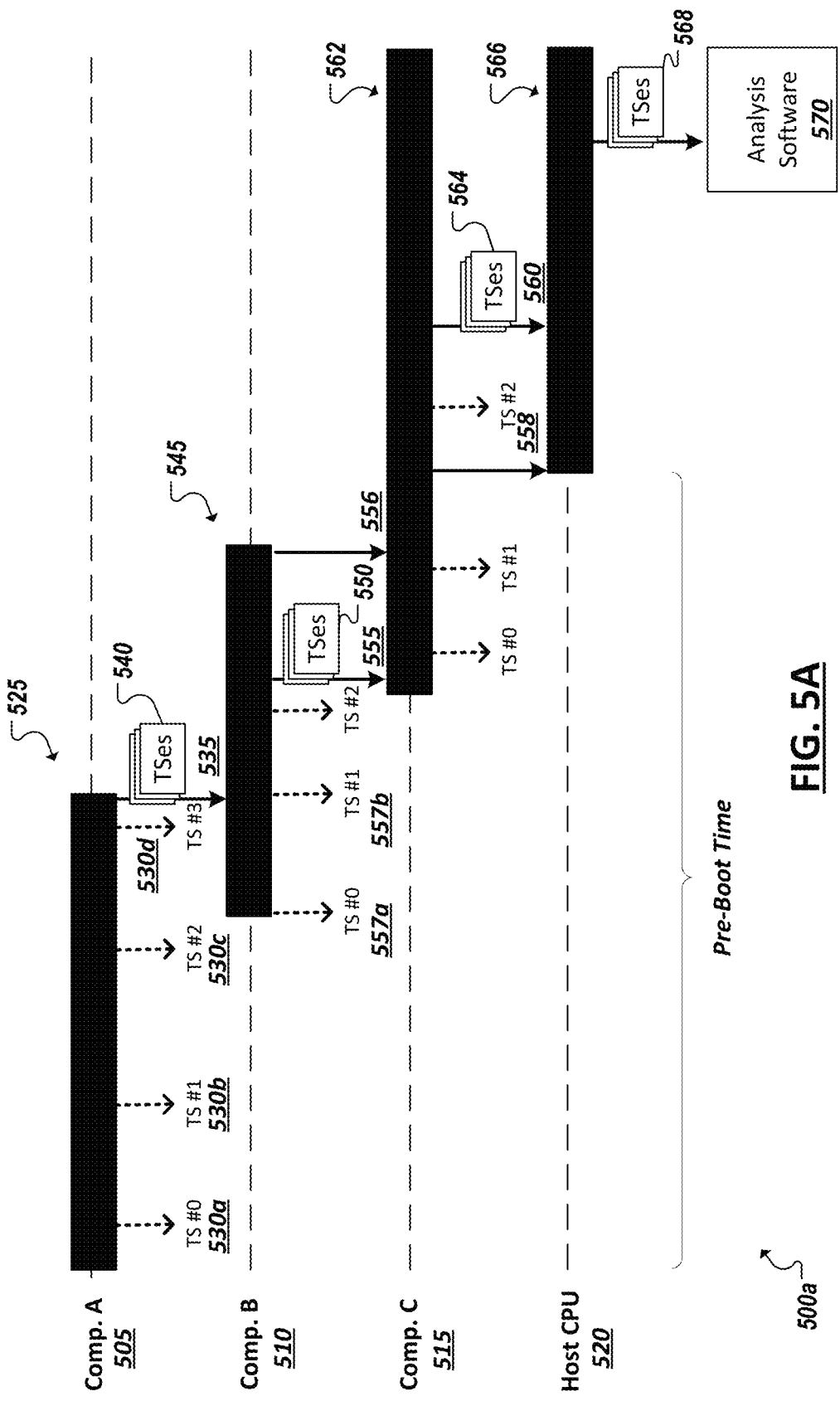
FIGS. 5A-5B are flow diagrams illustrating portions of an example boot sequence.

FIG. 5A is a diagram 500a illustrating the development of an example chain of performance data to describe pre-boot time performance characteristics of components participating in pre-boot time actions. In the particular simplified example of FIG. 5A, components 505, 510, 515 are provided, which are designated to perform various tasks during pre-boot time before the activation of host CPU 520 and before any higher-level measurement and analysis tools (e.g., analysis software 570) run on the CPU 520 are available to assist in measuring performance of these components (e.g., 510, 515, 520). The pre-boot time components 510, 515, 520 in this example may be equipped with internal performance monitoring logic, such as timer blocks, to identify performance parameters and generate data describing such parameters. For instance, each of components 505, 510, 515 may include respective timer blocks to generate ticks according to a frequency to mark an amount of time since the corresponding component was launched or the passage of time from a given event detected at the component (e.g., 505, 510, 515), among other (i.e., non-timing-related) performance information.

In the example of FIG. 5A, timestamps (e.g., TS0-TS3 (530a-d)) may be generated by each of the pre-boot components 505, 510, 515, with each timestamp indicating an amount of time measured by the component's timer since either the start (e.g., activation, start of execution, emergence from reset) of the component or from the generation of a preceding timestamp by the component. As each of the components (e.g., 505, 510, 515) may have a separate and independent clock (and timer logic), in isolation, the timestamps of any one of the multiple pre-boot components may be of little use in determining the contribution of an individual pre-boot activity to the overall boot time of the platform. Accordingly, the pre-boot components 505, 510, 515 may be configured to cooperate to build an aggregate collection or chain of timestamps, which may be communicated to a CPU-based component by the first pre-boot component whose operation extends beyond pre-boot time and possess an interface to the CPU 520.

Continuing with the example of FIG. 5A, components 505, 510, 515 may exchange various messages, packets, or signals (sometimes referred to herein collectively as "messages") (e.g., 535, 555, 556, 558, 560, etc.) during pre-boot time. Some of these messages may be predefined messages corresponding with the particular boot flow activities to be performed by the corresponding component. These messages may be leveraged and supplemented to communicate timestamp data collected by a sending component. In other instances, some messages may be newly defined for the express purpose of communicating such timestamp data and other data describing performance attributes of the component to facilitate a chain of performance data.

In the particular example of FIG. 5A, a first component 505 may serve as the initial component to be activated during a boot flow of a platform. The initial clock tick of the execution (e.g., 525) of the initial component may serve as the zero-time mark for the boot flow. The component 505 may generate timestamps (e.g., 530a-d) throughout the course of its execution. Some timestamps may be generated to correspond with the performance or initiation of a particular task, the receipt of a message from another component, the detection of a particular event, etc. In other cases, timestamps may be generated according to a set frequency, among other example implementations. In this example, the initial component may be configured to return to reset or an inactive mode prior to the host CPU 520 exiting reset. Accordingly, while the component 505 is still active, the component 505 may select one or more messages (e.g., 535) that it is to send to another component (e.g., 510) in the platform during the boot flow. Potentially any message may be selected to be supplemented with or otherwise include timestamp information (e.g., 540) corresponding to and describing executing time information in timestamps (e.g., 530*a-d*) generated by the component 505. In the example of FIG. 5A, the message 535 in which timestamp data 540 is included may be one of the final (or the final) message(s) sent from the component 505 to the receiving component 510 before the sending component 505 becomes inactive. However, in other examples, the message that includes the timestamp data may be one of the first messages sent by the component (e.g., 505) or potentially any message sent prior to the retirement of component in the boot flow. In some implementations, timestamp information (e.g., 540) may describe the overall time elapsed since the initiation of the component 505 (as reflected also in timestamps 530*a-d*). In other instances, the timestamp information may include the timestamps themselves. For instance, all of the timestamps (or a most recent subset of the generated timestamps) generated by the component may be included, as a batch (e.g., 540), in the message 535. Each message (e.g., 535, 55, 560, etc.) sent to communicate collected timestamps may be generated to itself include a timestamp to indicate the time at which the message was generated or sent, providing context to the receiving component (e.g., 510) for the timing information included in the message, among other example information.

Continuing with the example of FIG. 5A, a second component 510 (e.g., participating in a portion 545 of the critical path of the boot flow) may receive a message 535 from a preceding component (e.g., 505) participating in the boot flow. The message 535 may be selected to be sent based on a determination that both the sending and receiving components (505 and 510) are included in the critical path of the boot flow, and further based on the message following a span of the sending component's flow that corresponds to its participation in the critical path. In this manner, timing information collected by the component 505 describing its performance in the critical path of the boot flow may be collected and communicated further. Indeed, in some instances, a given component's participation in the critical path of the boot flow may only be for a limited duration of its overall execution time.

A component (e.g., 510, 515) receiving timestamp information from another component (e.g., 505, 510 respectively) upstream from the component in the boot flow may combine this timestamp information with its own locally generated timestamp information (e.g., timestamps 557*a-b*, etc.) and forward aggregated timing information on to the next component in the pre-boot portion of the flow or, if the CPU 520 has been activated, to a component running on the CPU 520 to expose the collected timing data to system software. For instance, component 510 may generate its own set of timestamps (e.g., 557*a-b*) and may append timestamps (e.g., 540) received from a preceding component 505 (at 535) with its own timestamps to create a two-component chain of timestamps (e.g., 550). The component 510 may likewise select one (e.g., 555) of potentially multiple messages (e.g., 555, 560) it sends on to a next component (e.g., 515) and includes this chain of timestamps (e.g., 550) in the message 555. Each subsequent pre-boot component participating in a pre-boot portion (e.g., 525, 545, 562, etc.) of the critical path of the boot flow may operate in like manner, accepting timestamps (or other timing information) from a preceding component and adding this timing information to the timing information it collects itself. This may continue until the chain of timing information (e.g., embodied in a collection of timestamps) is handled by a component (e.g., 515) that interfaces with the host CPU 520. This component 515 may, itself, generate timestamp information for at least that portion of the pre-boot flow it participates in and add these timestamps to the chain before forwarding the entire chain 564 (e.g., the combined timestamps of components 505, 510, and 515) to a CPU-based component (e.g., BIOS) (at 560). Collection of additional timing and other performance information may then be passed on to software-based monitoring tools. The combined timing information (e.g., 568) may be processed by analysis software tools (e.g., 570) to determine an overall boot time for the system, as well as identify the contributions to the boot time by the individual components in the platform.

In addition to generating a chain of performance data using timing data (e.g., 540) received from a preceding pre-boot component (e.g., 505), the receiving component (e.g., 510) may further use the timing information (e.g., 540) to calibrate its own clock and timing information to normalize the times reported within the chain of performance data. For instance, based on the timing information included in timestamps (e.g., 540) from the previous component 505, the receiving component 510 may determine its start time relative to the start time of the sending component 505 (and ultimately determine the total amount of time from the fixed zero of the initial component in the pre-boot flow). In some cases, this information may be used to synchronize or normalize the clock of the receiving component 510 with that of the sending component 505. In some instances, the receiving component 510 may adjust the timing information included in its own timestamps (e.g., 557*a-b*) to reflect the total time expired since the start of the initial component (e.g., 505) (rather than simply the time since the start of the specific component (e.g., 510) generating the timestamps (e.g., 557*a-b*). Accordingly, normalization and/or synchronization performed by a receiving component (e.g., 510, 515) based on the time information from the preceding component(s) may be applied within each progressive version of the chain of timing data (e.g., 550, 560, etc.) generated and forwarded on by the components. In other cases, no normalization may be applied, with the task of normalizing the various timestamps (generated according to independent clocks of the various pre-boot components) being delegated to system software (e.g., 570) tasked with analyzing and ultimately consuming the boot performance data generated by the components (e.g., 505, 510, 515) and CPU-run tools, among other example implementations.

Figure 5B:
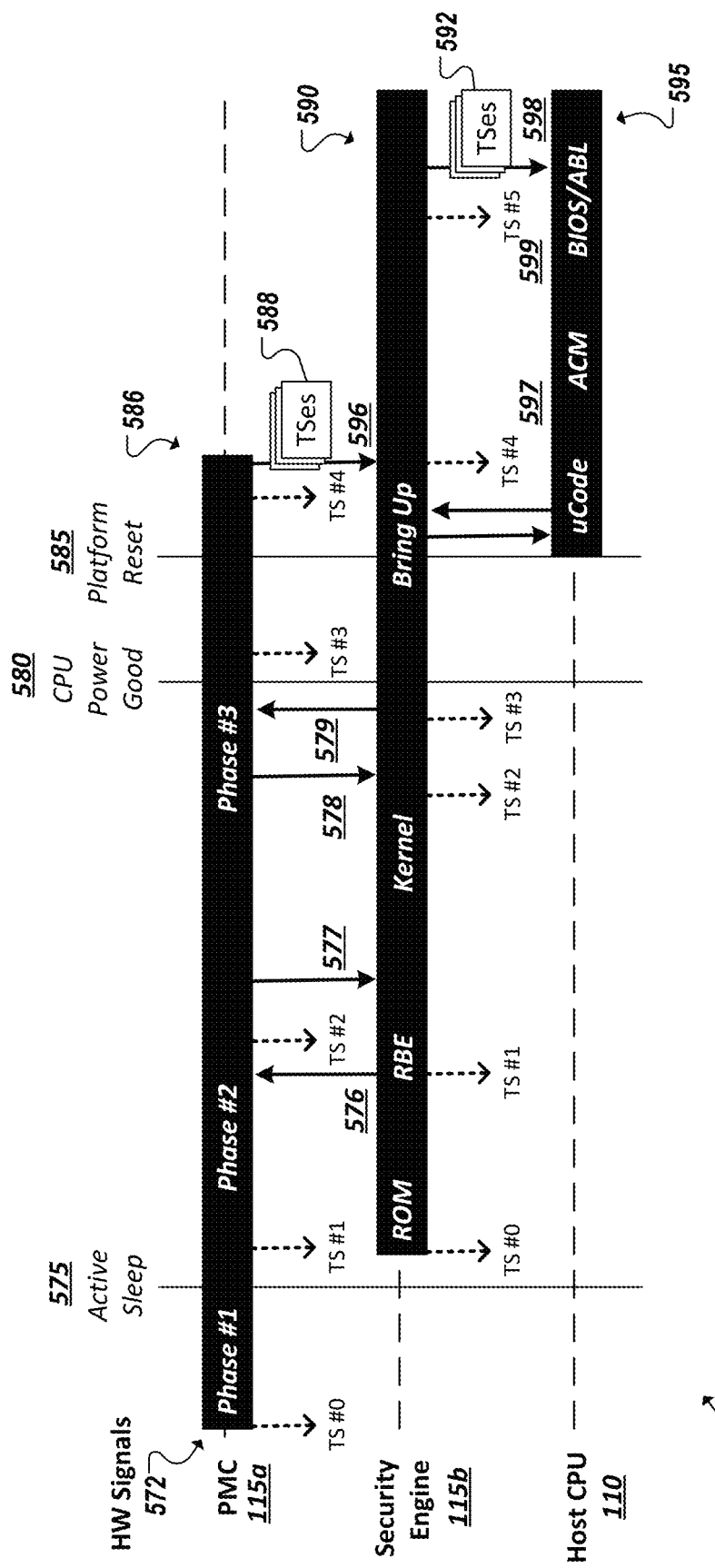

Turning to FIG. 5B, another flow diagram 500*b* is shown illustrating a simplified boot flow of a specific example system, such as one of the example in-vehicle systems discussed in the examples of FIGS. 3 and 4B. In this example, the simplified view of the boot flow omits those component and activities, whose execution are considered to fall outside of a critical boot performance chain accountable for the overall execution or boot time of the system. For instance, the example computing platform shown in FIG. 5B may include a platform controller hub, that includes a power management controller (PMC) 115*a* and a security engine 115*b*, such as a cryptographic service engine (CSE), and a CPU. In this example, both the PMC 115*a* and CSE 115*b* which both begin operation prior to the CPU emerging from reset. As in the generalized example illustrated and discussed above in connection with FIG. 5A, a chain of performance data may be collected using at least those devices participating in the pre-boot stages of the boot flow to ensure important performance is captured even before the host CPU is out of reset and more robust system management tools are able to run and monitor performance of the system. In this example, the PMC and CSE perform activities that must run before the main system CPU can be put out of reset. Each of the PMC and CSE (and CPU) may have their own clock. The PMC and CSE may further include timer blocks and other performance monitoring hardware or firmware that is independent of the host CPU. For instance, each of the PMC and CSE in this example may have a tick counter or other timing logic, which may be used to calculate an amount of time that has passed since the component began executing or came out of reset.

In the particular example illustrated in FIG. 5B, the PMC, security engine, and CPU may begin running at different points in the flow, with each one of them using its own (at least initially) independent clock. For instance, at power on (e.g., 572) the PMC 115a is launched and its clock starts to run. Upon performing certain power stabilization and management tasks, the PMC may ready the platform to launch the security engine, such as through assertion of an active sleep signal 575 which causes the security engine 115b to come out of reset and begin running (including the clock of the security engine). In this example, operation of the PMC 115a and security engine 115b may overlap for a period. Indeed, the PMC 115a and security engine 115b may exchange various messages (e.g., 576-579) in accordance with various activities to performed in the boot flow. For instance, the security engine 115b may perform a series of activities to prepare security of the platform. When these checks and other security preparations are completed by the security engine 115b, the security engine 115b may notify the PMC 115a (e.g., using message 576 (such as a Host Prep Boot Done message)). Upon receiving this message 576 the PMC 515a may assert one or more additional signals (e.g., 580, 585) to cause the host CPU 110 to come out of reset. As the CPU 5### starts to run, the CPU 110 may execute CPU microcode and launch one or more tools for performing tasks in the boot flow, such as an authenticated code module (ACM) (e.g., to measure the BIOS code), the system BIOS, a boot loader (e.g., ABL), among other modules, which may provide an interface through which data collected and passed by the pre-boot components (e.g., 115a, 115b) may ultimately be passed to system software.

Continuing with the example of FIG. 5B, as in the example of FIG. 5A above, the PMC 115a may generate a sequence of timestamps (e.g., TS 0-4). Likewise, security engine 115b may also generate a sequence of timestamps (e.g., TS 0-5) during its execution. In this example, in a final message (e.g., 596) scheduled for sending from the PMC 115a to the security engine 115b, the PMC 115 may send its previously collected timestamps (e.g., TS 0-4) as a batch of timestamps 588 in message 596.

Further, in some implementations, when the PMC 115a sends this message 596 with its timestamps 588 to security engine 115b, the PMC 115a identifies to the security engine 115b the total time that passed since the PMC 115a started to run. As a result, the security engine 115b may identify how to synchronize its own clock with the PMC clock, as well as calibrate the timing data it generates and sends (e.g., as 592) to reflect the total time since the PMC 115a started to run in the pre-boot sequence.

In the particular example of FIG. 5B, the security engine may be configured to remain running (at 590) following the emergence of the CPU 110 from reset. The security engine 115b may continue to perform security management tasks for the platform through the duration of the platform's operation. Indeed, the security engine 115b may generate timestamp data before and after the launch of the host CPU 110 (e.g., at 597, 599) in accordance with various events and actions taken by the security engine 115 during the continuing boot flow. The security engine 115b, like other pre-boot components, may be configurable to generate timestamps in accordance with particular events or a particular cadence or frequency. Further, the resolution or units of measurement may also be configured for the timing information generated and reported by the component through its respective timestamps, among other configurable attributes. As the security engine 115b in this example may still be active while the CPU 110 is active, the security engine 115 may be used to expose the pre-boot data collected by pre-boot components (e.g., 115a-b) to system software running on the host CPU 110. For instance, a message 598 may be leveraged to send a chain of timestamp data 592 to the BIOS or bootloader or another component of the CPU 110. Further, as the security engine 115b continues to run after the CPU is out of reset, the timing data (e.g., 588) received from other components (e.g., 115a) and generated by the security engine may be preserved (and in some cases stored is memory of the security engine) allowing potentially multiple opportunities for the pre-boot performance data to be collected by or otherwise accessed by system software.

In the example of FIG. 5B, the host CPU 110 may be ready to receive pre-boot performance data (e.g., 592) from pre-boot components (e.g., 115b) when the bootloader and/or BIOS start to run. The CPU 110 may then exchange various messages with the security engine 115b (and other components). In one example, the message 598 including the accumulated timestamps 592 may be sent in a BIOS payload message (e.g., ME-BIOS Payload (MBP) message), among other examples. The BIOS, in this example, may then govern how and when the delivered pre-boot performance data is exposed to the software of the host operating system. For instance, system software may easily merge data collected from during the boot flow, thereby completing a record and data describing characteristics of a complete boot flow from power-on.

Figure 6:
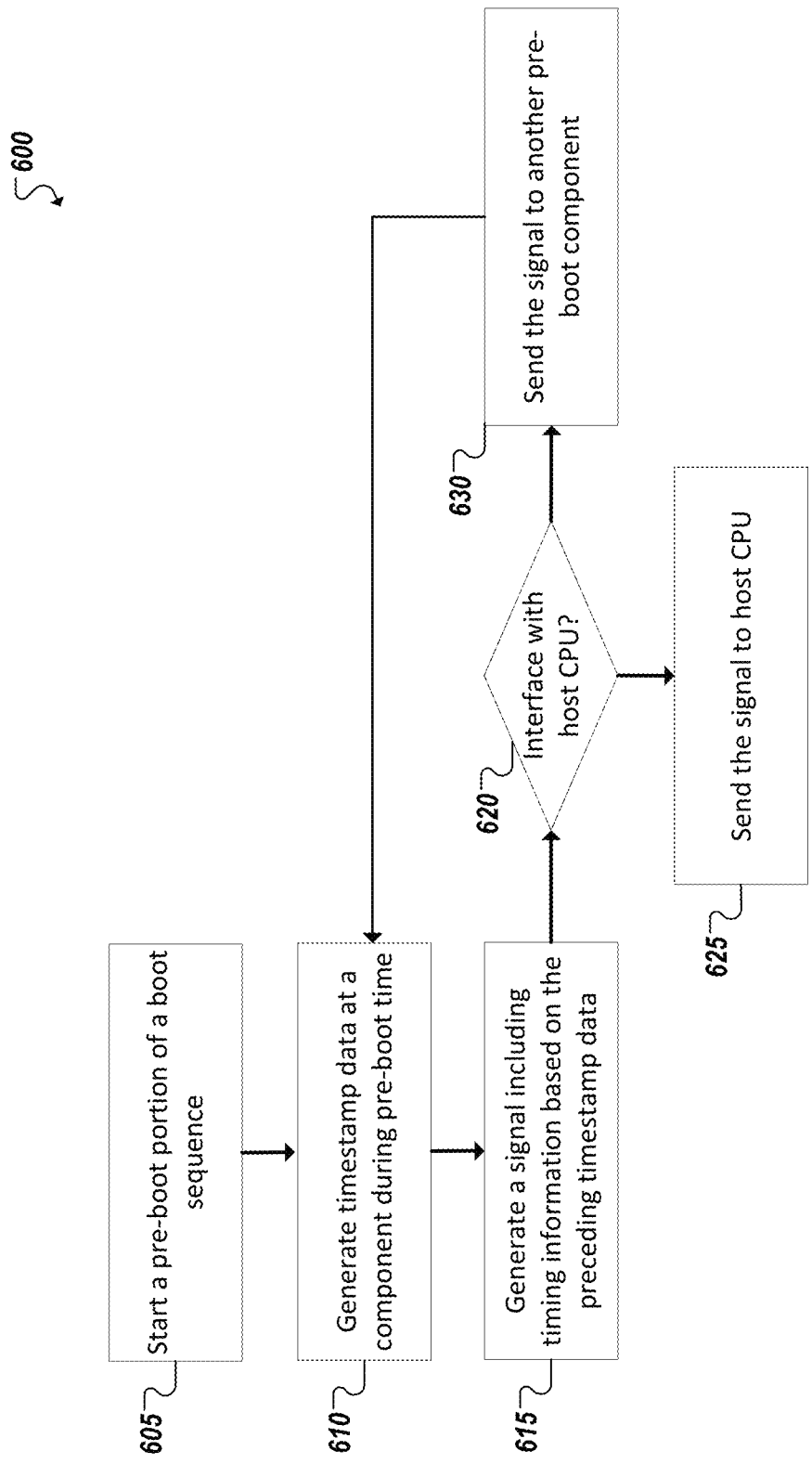
FIG. 6 is a flowchart of an example technique for determining performance characteristics of components in pre-boot time.

FIG. 6 is a flowchart 600 illustrating an example technique for monitoring boot flow performance within a computing platform. The technique may include the generation of a chain of performance data describing characteristics of component participating in a pre-boot portion of a boot sequence of the platform. For instance, an initial component may start 605 the boot sequence, with the first portion of the boot sequence constituting the pre-boot portion (i.e., prior to the activation of the host CPU). The pre-boot portion of the boot sequence may be used to prepare the platform for the activation of the host CPU. Timestamps may be generated 610 by the component to document the duration of time that has elapsed since the component was powered on or otherwise activated and began executing within the boot sequence. The timestamps may be shared with another component that is to continue running after the preceding component expires or finishes its operations. A signal may be generated 615 and either sent to the host CPU (at 625) if the current component possesses an interface to the host CPU and the host CPU is activated, or may be sent to another pre-boot component (at 630) if the CPU is not yet active and/or if the current component does not interface with the host CPU (determined at 620). In the case the timestamps are sent 630 to another pre-boot component, this next component may also generate timestamps 610 and eventually report all preceding timestamp information (e.g., by combining the timestamps received from the preceding component with the timestamps the current component generated) by sending this timing information to either the host CPU (at 625) or another pre-boot component (at 630). When the host CPU is activated, pre-boot time concludes, and no further component-generated timestamps may be considered, as the host CPU may enable more robust performance monitoring than is available to the components alone during pre-boot time.

Figure 7:
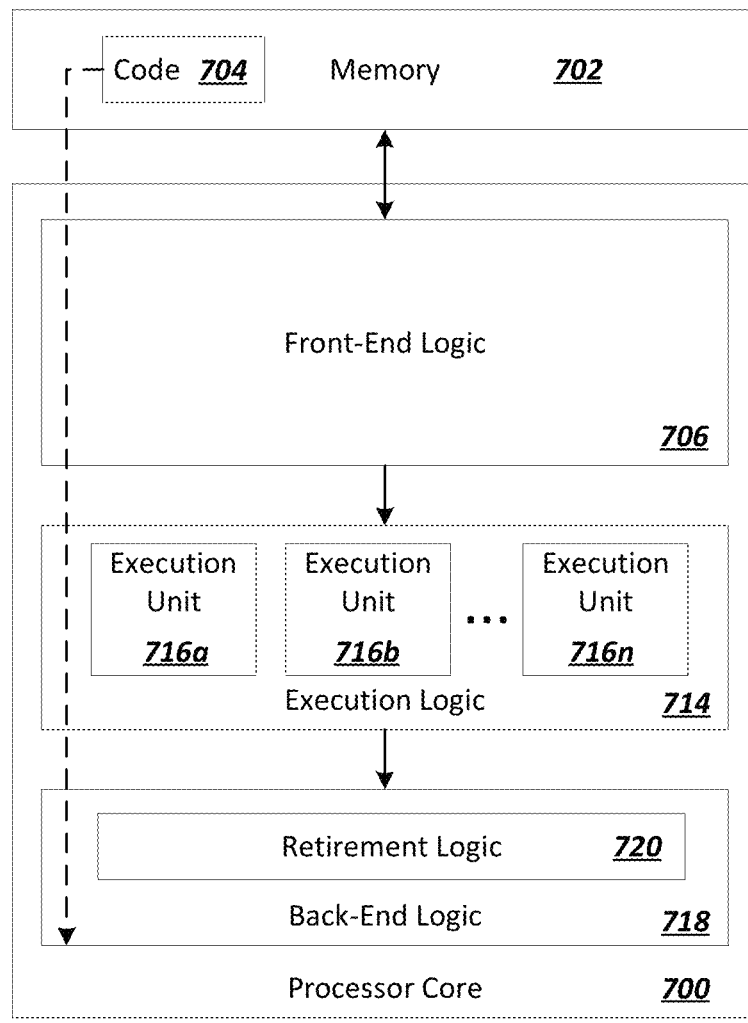
FIG. 7 is a block diagram of an exemplary processor in accordance with one embodiment.
Figure 8:
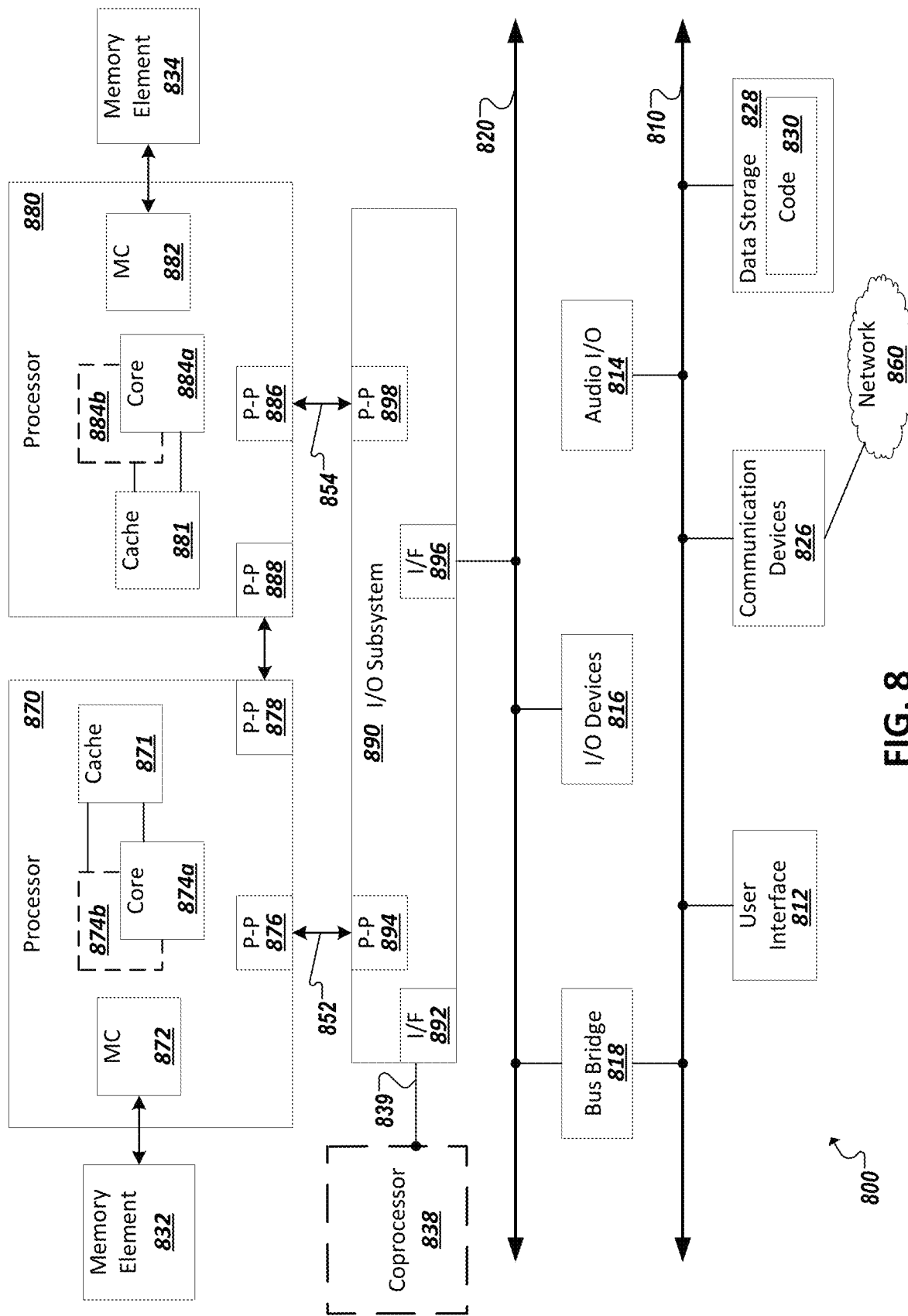
FIG. 8 is a block diagram of an exemplary computing system in accordance with one embodiment.

FIGS. 7-8 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 7-8.

FIG. 7 is an example illustration of a processor according to an embodiment. Processor 700 is an example of a type of hardware device that can be used in connection with the implementations above. Processor 700 may be any type of processor, such as a microprocessor, an embedded processor, a digital signal processor (DSP), a network processor, a multi-core processor, a single core processor, or other device to execute code. Although only one processor 700 is illustrated in FIG. 7, a processing element may alternatively include more than one of processor 700 illustrated in FIG. 7. Processor 700 may be a single-threaded core or, for at least one embodiment, the processor 700 may be multi-threaded in that it may include more than one hardware thread context (or "logical processor") per core.

FIG. 7 also illustrates a memory 702 coupled to processor 700 in accordance with an embodiment. Memory 702 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 700 can execute any type of instructions associated with algorithms, processes, or operations detailed herein. Generally, processor 700 can transform an element or an article (e.g., data) from one state or thing to another state or thing.

Code 704, which may be one or more instructions to be executed by processor 700, may be stored in memory 702, or may be stored in software, hardware, firmware, or any suitable combination thereof, or in any other internal or external component, device, element, or object where appropriate and based on particular needs. In one example, processor 700 can follow a program sequence of instructions indicated by code 704. Each instruction enters a front-end logic 706 and is processed by one or more decoders 708. The decoder may generate, as its output, a micro operation such as a fixed width micro operation in a predefined format, or may generate other instructions, microinstructions, or control signals that reflect the original code instruction. Front-end logic 706 also includes register renaming logic 710 and scheduling logic 712, which generally allocate resources and queue the operation corresponding to the instruction for execution.

Processor 700 can also include execution logic 714 having a set of execution units 716a, 716b, 716n, etc. Some embodiments may include a number of execution units dedicated to specific functions or sets of functions. Other embodiments may include only one execution unit or one execution unit that can perform a particular function. Execution logic 714 performs the operations specified by code instructions.

After completion of execution of the operations specified by the code instructions, back-end logic 718 can retire the instructions of code 704. In one embodiment, processor 700 allows out of order execution but requires in order retirement of instructions. Retirement logic 720 may take a variety of known forms (e.g., re-order buffers or the like). In this manner, processor 700 is transformed during execution of code 704, at least in terms of the output generated by the decoder, hardware registers and tables utilized by register renaming logic 710, and any registers (not shown) modified by execution logic 714.

Although not shown in FIG. 7, a processing element may include other elements on a chip with processor 700. For example, a processing element may include memory control logic along with processor 700. The processing element may include I/O control logic and/or may include I/O control logic integrated with memory control logic. The processing element may also include one or more caches. In some embodiments, non-volatile memory (such as flash memory or fuses) may also be included on the chip with processor 700.

FIG. 8 illustrates a computing system 800 that is arranged in a point-to-point (PtP) configuration according to an embodiment. In particular, FIG. 8 shows a system where processors, memory, and input/output devices are interconnected by a number of point-to-point interfaces. Generally, one or more of the computing systems described herein may be configured in the same or similar manner as computing system 700.

Processors 870 and 880 may also each include integrated memory controller logic (MC) 872 and 882 to communicate with memory elements 832 and 834. In alternative embodiments, memory controller logic 872 and 882 may be discrete logic separate from processors 870 and 880. Memory elements 832 and/or 834 may store various data to be used by processors 870 and 880 in achieving operations and functionality outlined herein.

Processors 870 and 880 may be any type of processor, such as those discussed in connection with other figures. Processors 870 and 880 may exchange data via a point-to-point (PtP) interface 850 using point-to-point interface circuits 878 and 888, respectively. Processors 870 and 880 may each exchange data with a chipset 890 via individual point-to-point interfaces 852 and 854 using point-to-point interface circuits 876, 886, 894, and 898. Chipset 890 may also exchange data with a co-processor 838, such as a high-performance graphics circuit, machine learning accelerator, or other co-processor 838, via an interface 839, which could be a PtP interface circuit. In alternative embodiments, any or all of the PtP links illustrated in FIG. 8 could be implemented as a multi-drop bus rather than a PtP link.

Chipset 890 may be in communication with a bus 820 via an interface circuit 896. Bus 820 may have one or more devices that communicate over it, such as a bus bridge 818 and I/O devices 816. Via a bus 810, bus bridge 818 may be in communication with other devices such as a user interface 812 (such as a keyboard, mouse, touchscreen, or other input devices), communication devices 826 (such as modems, network interface devices, or other types of communication devices that may communicate through a computer network 860), audio I/O devices 814, and/or a data storage device 828. Data storage device 828 may store code 830, which may be executed by processors 870 and/or 880. In alternative embodiments, any portions of the bus architectures could be implemented with one or more PtP links.

The computer system depicted in FIG. 8 is a schematic illustration of an embodiment of a computing system that may be utilized to implement various embodiments discussed herein. It will be appreciated that various components of the system depicted in FIG. 8 may be combined in a system-on-a-chip (SoC) architecture or in any other suitable configuration capable of achieving the functionality and features of examples and implementations provided herein.

While some of the systems and solutions described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

In general, one aspect of the subject matter described in this specification can be embodied in methods and executed instructions that include or cause the actions of identifying a sample that includes software code, generating a control flow graph for each of a plurality of functions included in the sample, and identifying, in each of the functions, features corresponding to instances of a set of control flow fragment types. The identified features can be used to generate a feature set for the sample from the identified features These and other embodiments can each optionally include one or more of the following features. The features identified for each of the functions can be combined to generate a consolidated string for the sample and the feature set can be generated from the consolidated string. A string can be generated for each of the functions, each string describing the respective features identified for the function. Combining the features can include identifying a call in a particular one of the plurality of functions to another one of the plurality of functions and replacing a portion of the string of the particular function referencing the other function with contents of the string of the other function. Identifying the features can include abstracting each of the strings of the functions such that only features of the set of control flow fragment types are described in the strings. The set of control flow fragment types can include memory accesses by the function and function calls by the function. Identifying the features can include identifying instances of memory accesses by each of the functions and identifying instances of function calls by each of the functions. The feature set can identify each of the features identified for each of the functions. The feature set can be an n-graph.

Further, these and other embodiments can each optionally include one or more of the following features. The feature set can be provided for use in classifying the sample. For instance, classifying the sample can include clustering the sample with other samples based on corresponding features of the samples. Classifying the sample can further include determining a set of features relevant to a cluster of samples. Classifying the sample can also include determining whether to classify the sample as malware and/or determining whether the sample is likely one of one or more families of malware. Identifying the features can include abstracting each of the control flow graphs such that only features of the set of control flow fragment types are described in the control flow graphs. A plurality of samples can be received, including the sample. In some cases, the plurality of samples can be received from a plurality of sources. The feature set can identify a subset of features identified in the control flow graphs of the functions of the sample. The subset of features can correspond to memory accesses and function calls in the sample code.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. Example 1 is an apparatus including: a particular component to be included in a multi-component computing system, where the system is to include a host central processing unit (CPU) and the particular component includes: logic including hardware circuitry to participate in a portion of a boot sequence of the system, where the portion of the boot sequence begins prior to activation of the host CPU, and the particular component is to send one or more signals to interact with another one of the components in the system during the portion of the boot sequence; a timer block to generate a set of timestamps during the portion of the boot sequence, where the set of timestamps indicates an amount of execution time of the particular component; and a transmitter to send the set of timestamps to the other component in a particular one of the one or more signals, where the set of timestamps are to be sent in association with determination of a total amount of execution time by components of the system to complete the boot sequence.

Example 2 may include the subject matter of example 1, where the logic is to cause the other component to be launched within the boot sequence.

Example 3 may include the subject matter of example 2, where the particular signal follows a signal used to launch the other component.

Example 4 may include the subject matter of any one of examples 1-3, where the particular component further includes a microcontroller separate from the host CPU and is the first component to launch in the system to begin the boot sequence.

Example 5 may include the subject matter of example 4, where the particular component includes a power management controller (PMC).

Example 6 may include the subject matter of any one of examples 1-5, where the set of timestamps includes a second set of timestamps, the other component includes a second component, and the particular component further includes a receiver to receive one or more signals from a first component within the system during the portion of the boot sequence, where one of the signals received by the particular component from the first component includes a first set of timestamps generated by the first component during the portion of the boot sequence.

Example 7 may include the subject matter of example 6, where the timer block is further to adjust values in the second set of timestamps based on time values in the first set of timestamps, where values in the adjusted values in the second set of timestamps reflect an amount of time expired from an initiation of the boot sequence.

Example 8 may include the subject matter of example 6, where the timer block is further to synchronize a clock of the particular component with a clock of the first component based on the first set of timestamps.

Example 9 may include the subject matter of example 6, where the particular signal includes both the first set of timestamps and the second set of timestamps.

Example 10 may include the subject matter of example 6, where the particular component includes a security engine and the logic is to implement functionality of the security engine.

Example 11 may include the subject matter of any one of examples 1-10, where the other component includes an interface to software running on the host CPU, the other component is to send the set of timestamps to the software, and the software is to determine a total execution time of the boot sequence.

Example 12 may include the subject matter of any one of examples 1-11, where the particular component continues running in the boot sequence following the activation of the host CPU.

Example 13 may include the subject matter of any one of examples 1-12, where the logic is implemented at least in part in firmware of the particular component.

Example 14 is a machine accessible storage medium having instructions stored thereon, where the instructions when executed on a machine, cause the machine to: receive a first set of timing information from a first component in a multi-component computing system, where the first component includes one of a set of components in the computing system to participate in a pre-boot portion of a boot sequence of the computing system, the pre-boot portion precedes activation of a host central processing unit (CPU) of the system, where the first set of timing information is received at a second component in the set of components; generate a second set of timing information at the second component, where the second set of timing information identifies a duration of the participation of the second component in the boot sequence; and send a signal from the second component to a third component in the computing system, where the signal includes the first and second sets of timing information.

The storage medium of example 14, where the first and second sets of timing information each includes a respective set of timestamps.

The storage medium of any one of examples 14-15, where the third component includes an interface to software of the computing system, the third component participates in the boot sequence following activation of the host CPU, and the third component is to pass the first and second sets of timing information to the software.

The storage medium of any one of examples 14-16, where the instructions, when executed, further cause the machine to synchronize a clock of the second component based on the first timing information.

Example 18 is a system including: a central processing unit (CPU); a power management controller to participate in a pre-boot portion of boot flow of the system, where the pre-boot portion precedes and prepares for activation of the CPU; and a particular component to participate in the pre-boot portion of the boot flow of the system. The power management controller includes: a first timer block to generate a first set of timestamps during the pre-boot portion of the boot sequence, where the first set of timestamps indicates a first duration of time measured from activation of the power management controller; and a transmitter to send a first signal to the particular component, where the first signal includes timing information from the first set of timestamps. The particular component includes: a second timer block to generate a second set of timestamps during the pre-boot portion of the boot sequence, where the second set of timestamps indicates a second duration of time measured from activation of the particular component; and a transmitter to send a second signal to the CPU, where the second signal includes timing information based on both the first set of timestamps and the second set of timestamps. Example 19 may include the subject matter of example 18, where the particular component includes a security engine to perform hardware-based security checks of the system.

Example 20 may include the subject matter of any one of examples 18-19, where the system includes one of an in-vehicle computing system or an Internet of Things (IoT) device.

Example 21 may include the subject matter of any one of examples 18-20, where the power management controller includes a microcontroller.

Example 22 may include the subject matter of example 21, where the microcontroller initiates the boot flow.

Example 23 may include the subject matter of any one of examples 18-22, where the CPU is to execute one or more system measurement utilities during the boot flow, and the system measurement utilities are to measure execution time of components in the system after activation of the CPU.

Example 24 may include the subject matter of example 23, where the system measurement utilities include system software.

Example 25 may include the subject matter of example 23, where the system management utilities include a Basic Input/Output System (BIOS).

Example 26 may include the subject matter of example 23, where the CPU is to further execute one or more software-based tools to determine performance of the system during the boot flow based on the first and second sets of timestamps.

Example 27 may include the subject matter of example 26, where the second signal is to provide the timing information based on the first and second sets of timestamps to the one or more software-based tools.

Example 28 may include the subject matter of any one of examples 18-27, where the first signal includes the first set of timestamps.

Example 29 may include the subject matter of any one of examples 18-28, where the second signal includes the second set of timestamps.

Example 30 is a method including: receiving a first set of timing information from a first component in a multi-component computing system, where the first component includes one of a set of components in the computing system to participate in a pre-boot portion of a boot sequence of the computing system, the pre-boot portion precedes activation of a host central processing unit (CPU) of the system, where the first set of timing information is received at a second component in the set of components; generating a second set of timing information at the second component, where the second set of timing information identifies a duration of the participation of the second component in the boot sequence; and sending a signal from the second component to a third component in the computing system, where the signal includes the first and second sets of timing information.

Example 31 may include the subject matter of example 30, where the first and second sets of timing information each includes a respective set of timestamps.

Example 32 may include the subject matter of any one of examples 30-31, where the third component includes an interface to software of the computing system, the third component participates in the boot sequence following activation of the host CPU, and the third component is to pass the first and second sets of timing information to the software.

Example 33 may include the subject matter of any one of examples 30-32, where the instructions, when executed, further cause the machine to synchronize a clock of the second component based on the first timing information.

Example 34 may include the subject matter of any one of examples 30-33, further including launching the third component using a hardware signal.

Example 35 may include the subject matter of example 34, where the signal including the first and second sets of timing information follows the hardware signal.

Example 36 may include the subject matter of any one of examples 30-35, where the first component is to begin the boot sequence.

Example 37 may include the subject matter of example 36, where the first component includes a power management controller (PMC).

Example 38 may include the subject matter of any one of examples 30-37, where one of the second and third components includes a security engine.

Example 39 may include the subject matter of any one of examples 30-38, where the third component interfaces with software run on the host CPU.

Example 40 may include the subject matter of any one of examples 30-39, where the second set of timing information includes a second set of timestamps generated at the second component.

Example 41 may include the subject matter of example 40, where the first set of timing information includes a first set of timestamps generated at the first component.

Example 42 may include the subject matter of example 41, where the signal includes both the first set of timestamps and the second set of timestamps.

Example 43 may include the subject matter of any one of examples 30-42, where at least one of the second component or the third component continues running in the boot sequence following the activation of the host CPU.

Example 44 is a system including means to perform the method of any one of examples 30-43.

Example 45 may include the subject matter of example 44, where the means include a computer-readable medium with instructions stored therein, the instructions executable by a machine to cause the machine to perform at least a portion of the method of any one of examples 30-43.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An apparatus comprising:
   a particular component to be included in a multi-component computing system, wherein the system is to comprise a host central processing unit (CPU) and the particular component comprises:
   logic comprising hardware circuitry to participate in a portion of a boot sequence of the system, wherein the portion of the boot sequence begins prior to activation of the host CPU, and the particular component is to send one or more signals to interact with an other component in the system during the portion of the boot sequence;
   a timer block to generate a set of timestamps during the portion of the boot sequence, wherein the set of timestamps indicates an amount of execution time of the particular component; and
   a transmitter to send the set of timestamps to the other component in a particular one of the one or more signals,
   wherein the set of timestamps are to be sent in association with determination of a total amount of execution time to complete the boot sequence.

2. The apparatus of claim 1, wherein the logic is to cause the other component to be launched within the boot sequence.

3. The apparatus of claim 2, wherein the particular signal follows a signal used to launch the other component.

4. The apparatus of claim 1, wherein the particular component further comprises a microcontroller separate from the host CPU and is the first component to launch in the system to begin the boot sequence.

5. The apparatus of claim 4, wherein the particular component comprises a power management controller (PMC).

6. The apparatus of claim 1, wherein the set of timestamps comprises a second set of timestamps, the other component comprises a second component, and the particular component further comprises a receiver to receive one or more signals from a first component within the system during the portion of the boot sequence, wherein one of the signals received by the particular component from the first component comprises a first set of timestamps generated by the first component during the portion of the boot sequence.

7. The apparatus of claim 6, wherein the timer block is further to adjust values in the second set of timestamps based on time values in the first set of timestamps, wherein values in the adjusted values in the second set of timestamps reflect an amount of time expired from an initiation of the boot sequence.

8. The apparatus of claim 6, wherein the timer block is further to synchronize a clock of the particular component with a clock of the first component based on the first set of timestamps.

9. The apparatus of claim 6, wherein the particular signal comprises both the first set of timestamps and the second set of timestamps.

10. The apparatus of claim 6, wherein the particular component comprises a security engine and the logic are to implement functionality of the security engine.

11. The apparatus of claim 1, wherein the other component comprises an interface to software running on the host CPU, the other component is to send the set of timestamps to the software, and the software is to determine a total execution time of the boot sequence.

12. The apparatus of claim 1, wherein the particular component continues running in the boot sequence following the activation of the host CPU.

13. The apparatus of claim 1, wherein the logic is implemented at least in part in firmware of the particular component.

14. At least one machine accessible storage medium having instructions stored thereon, the instructions when executed on a machine, cause the machine to:
receive a first set of timing information from a first component in a multi-component computing system, wherein the first component comprises one of a set of components in the computing system to participate in a pre-boot portion of a boot sequence of the computing system, the pre-boot portion precedes activation of a host central processing unit (CPU) of the system, wherein the first set of timing information is received at a second component in the set of components;
generate a second set of timing information at the second component, wherein the second set of timing information identifies a duration of the participation of the second component in the boot sequence; and
send a signal from the second component to a third component in the computing system, wherein the signal comprises the first and second sets of timing information.

15. The storage medium of claim 14, wherein the first and second sets of timing information each comprises a respective set of timestamps.

16. The storage medium of claim 14, wherein the third component comprises an interface to software of the computing system, the third component participates in the boot sequence following activation of the host CPU, and the third component is to pass the first and second sets of timing information to the software.

17. The storage medium of claim 14, wherein the instructions, when executed, further cause the machine to synchronize a clock of the second component based on the first timing information.

18. A system comprising:
a central processing unit (CPU);
a power management controller to participate in a pre-boot portion of boot flow of the system, wherein the pre-boot portion precedes and prepares for activation of the CPU; and
a particular component to participate in the pre-boot portion of the boot flow of the system, wherein:
the power management controller comprises:
a first timer block to generate a first set of timestamps during the pre-boot portion of the boot sequence, wherein the first set of timestamps indicates a first duration of time measured from activation of the power management controller; and
a transmitter to send a first signal to the particular component, wherein the first signal comprises timing information from the first set of timestamps; and
the particular component comprises:
a second timer block to generate a second set of timestamps during the pre-boot portion of the boot sequence, wherein the second set of timestamps indicates a second duration of time measured from activation of the particular component; and
a transmitter to send a second signal to the CPU, wherein the second signal comprises timing information based on both the first set of timestamps and the second set of timestamps.

19. The system of claim 18, wherein the particular component comprises a security engine to perform hardware-based security checks of the system.

20. The system of claim 18, wherein the system comprises one of an in-vehicle computing system or an Internet of Things (IoT) device.

* * * * *